United States Patent [19]

Bertoglio et al.

[11] 4,165,447

[45] Aug. 21, 1979

[54] CENTRALIZED DATA-REGISTRATION EQUIPMENT FOR TRAFFIC SUPERVISION IN TELECOMMUNICATION SYSTEM

[75] Inventors: Ottavio Bertoglio; Spiridione De Micheli, both of Turin; Paolo Tiribelli, Pino Torinese-Torino, all of Italy

[73] Assignee: CSELT — Centro Studi e Laboratori Telecomunicazioni, Turin, Italy

[21] Appl. No.: 833,363

[22] Filed: Sep. 14, 1977

[30] Foreign Application Priority Data

Sep. 15, 1976 [IT] Italy ................................ 69239 A/76

[51] Int. Cl.² .......................................... H04M 15/00
[52] U.S. Cl. .................................. 179/7.1 R; 179/8 A
[58] Field of Search .............. 179/7.1 R, 7.1 TP, 7 R, 179/7 MM, 8 A, 175.2 R, 15 BF

[56] References Cited

U.S. PATENT DOCUMENTS

| | | | |
|---|---|---|---|
| 3,825,689 | 7/1974 | Baichtal et al. | 179/7 R |
| 3,870,824 | 3/1975 | Baichtal et al. | 179/7 R |
| 3,916,123 | 10/1975 | Werner et al. | 179/7.1 R |
| 3,944,746 | 3/1976 | Burns et al. | 179/7.1 R |
| 4,022,978 | 5/1977 | Connell et al. | 179/7.1 R |
| 4,066,843 | 1/1978 | Waks et al. | 179/7.1 R |

*Primary Examiner*—Kathleen H. Claffy
*Assistant Examiner*—Gerald L. Brigance
*Attorney, Agent, or Firm*—Karl F. Ross

[57] ABSTRACT

To facilitate the supervision of long-distance telephone traffic over an extended area, output signals from call monitors associated with a number of trunk lines are fed to respective detectors working into a common preprocessor in which certain parameters of toll calls carried by each of these trunk lines, such as number and length of engagements, number and length of conversations and number of metering pulses, are registered in real time with the aid of respective counters for subsequent transfer to a final processor. The contents of each counter are read out to a buffer memory, within the preprocessor, upon the termination of the respective call or at any time in response to an external command. The preprocessor may be duplicated in order to minimize the effect of malfunctions, with inhibition of the loading and unloading of the counters of either unit until a confirmation signal is received from the other unit or a certain number of operating cycles have elapsed. The final processor can be programmed to determine significant deviations of various aspects of the traffic pattern from a norm.

10 Claims, 5 Drawing Figures

3,165,447

CENTRALIZED DATA-REGISTRATION EQUIPMENT FOR TRAFFIC SUPERVISION IN TELECOMMUNICATION SYSTEM

FIELD OF THE INVENTION

Our present invention relates to an apparatus for supervising the activities of different signal paths, such as trunk lines, in a telephone or other telecommunication system.

BACKGROUND OF THE INVENTION

In order to ascertain traffic density and to check on the reliability of various types of telecommunication equipment, such as meters serving for the determination of toll charges, it is known to utilize statistical counters which register such parameters as the number and the duration of attempted and completed calls taking place over a given trunk line as well as the number of metering pulses transmitted thereover. For a system-wide evaluation of such statistical data, the contents of these widely scattered statistical counters must be transmitted to a centralized location; this is generally done by periodically photographing the readings of the counters and feeding the data so ascertained to a central processor. The latter may compare these data with a statistical norm to detect, for example, temporal and local overloads or an excessive rate of unsuccessful engagements, i.e. calls that did not go through. By noting the origins of the calls for which toll charges are calculated with the aid of metering pulses, the processor may also help allocate the revenues from these toll calls among different companies sharing the system.

This mode of data collection is rather laborious and correspondingly expensive. The available information can be collated only infrequently, e.g. once per month, and is thus often outdated, complicating the back-tracing of any malfunctions at the time of evaluation. The correction of possible defects is delayed and the procedure itself often gives rise to error. Moreover, it is difficult to synchronize the collection of data over a wide area in order to obtain a comprehensive picture of operating conditions existing at a particular time.

OBJECTS OF THE INVENTION

The general object of our present invention, therefore, is to provide centralized data-registration equipment facilitating the supervision of traffic in a telecommunication system with avoidance of the aforestated drawbacks.

A more particular object is to provide an apparatus which registers the relevant statistical data, obtained from a multiplicity of outlying monitoring units, automatically and in real time.

A further object is to provide means in such an apparatus for enabling the instantaneous ingathering of current information on the activities of all monitored signal paths regardless of distance.

SUMMARY OF THE INVENTION

An apparatus in accordance with our present invention comprises a plurality of signal detectors connected to respective monitoring units for receiving their output voltages and delivering them to a common scanner which derives therefrom a recurrent time-division-multiplex (TDM) frame having different time slots respectively allocated to these monitoring units. The scanner feeds conversion means, which may be part of a preprocessor, serving to translate a succession of recurrences of this TDM frame into code words each identifying an active signal path while carrying data related to that path's activity. The code words are stored in memory means, which may be located partly in the preprocessor and partly in a final processor following same, working into an evaluator within the final procesor which compares the contents of the stored code words with a preprogrammed set of parameters. The output of the evaluator may be utilized in various ways, as for emitting alarm signals in the event of a detected malfunction and for visually displaying the ascertained activity pattern on an indicator at an observer's post.

Pursuant to a more particular feature of our invention, the preprocessor is provided with timing means for synchronizing its own operation with that of the signal detectors.

According to a more specific feature of our invention, the conversion means of the preprocessor comprises logical circuitry receiving the TDM frame from the scanner and controlling a message former which generates outgoing code words in response to differences between successive recurrences of that frame reflecting certain status changes in the monitored signal paths, such as the start and the end of engagement of a trunk line by a calling party, the establishment and the termination of a communication between that party and a called party, and the transmission of metering pulses over the seized line. Advantageously, the scanner has a collateral input for externally generated asynchronous signals including readout commands which are insertable into the TDM frame to operate control means for activating the message former independently of any status change.

BRIEF DESCRIPTION OF THE DRAWING

The above and other features of our invention will now be described in detail with reference to the accompanying drawing in which.

SPECIFIC DESCRIPTION

Figure 1:
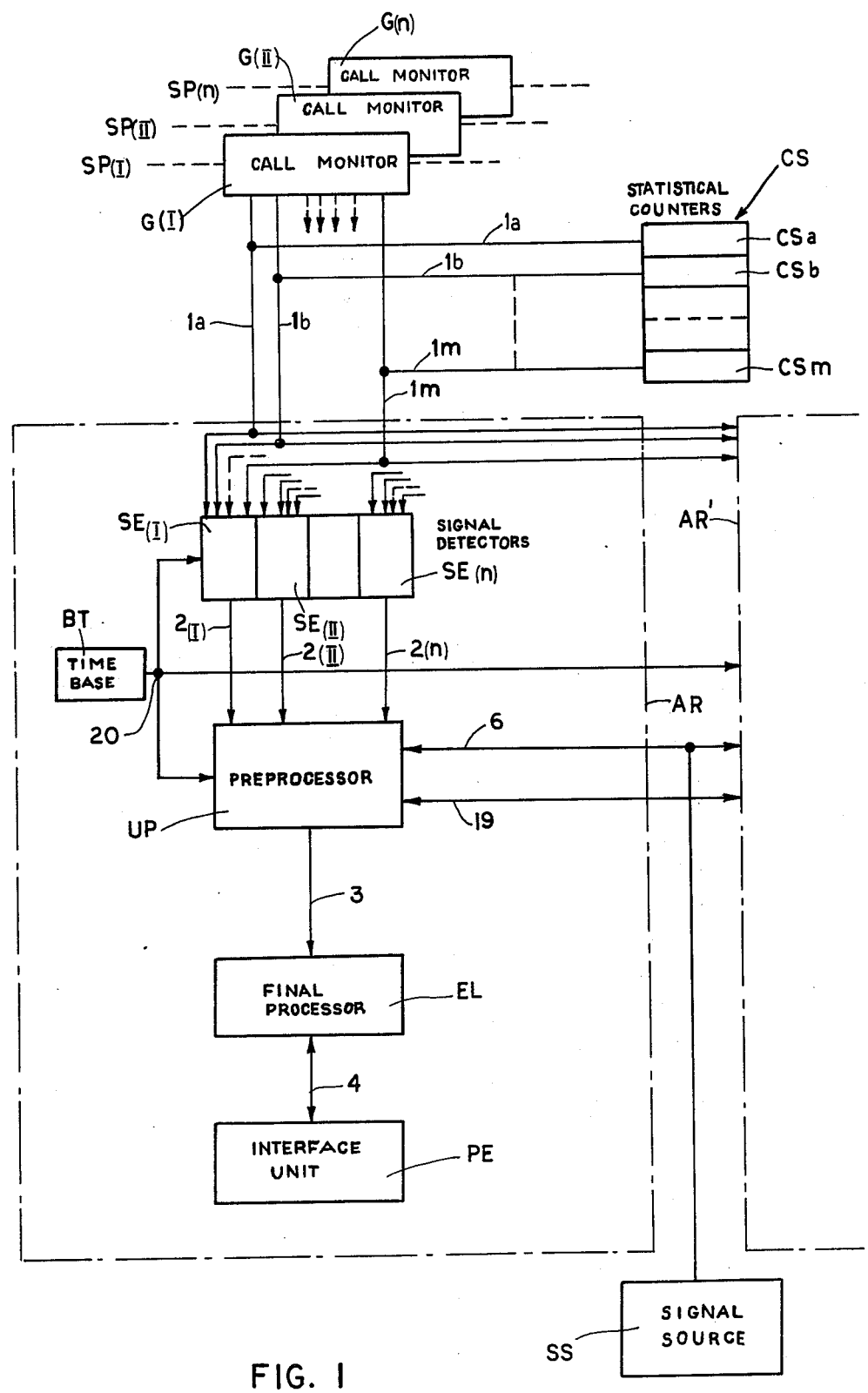
FIG. 1 is a block diagram of an apparatus embodying our invention.

In FIG. 1 we have illustrated a group of call monitors G(I), G(II), ... G(n) inserted in respective signal paths SP(I), SP(II), ... SP(n) for the purpose of surveying the activities of these paths, which may be trunk lines of a telephone system, in a manner known per se. The call monitors and their associated trunk lines may be disposed at widely separated locations but all connected to a common supervisory apparatus AR and, in parallel therewith, to a duplicate AR' thereof for verification purposes. Each call monitor has a set of output leads of which only those emanating from monitor G(I) have been illustrated; these leads, designated 1a, 1b, ... 1m, extend to a set of statistical counters CSa, CSb, ... CSm at a local supervisory post CS and in parallel therewith to the two identical centralized components AR and AR'. The number of statistical counters may differ from the number of output leads and from the number of monitored activity criteria since the same lead may extend to more than one counter, e.g. for measuring the number of engagements on the one hand and their duration on the other hand, and since the same criterion may appear in different leads, as for distinguishing between operator-assisted and direct-dialed calls. The monitoring units are of conventional type and determine, for example, the seizure of a line by a calling station, the address of the exchange serving that station, the transmission of dialing pulses identifying a called station, the response of the latter station, the transmission of metering pulses in the case of a toll call, the intervention or nonintervention of an operator, and the disengagement of the connection. For purposes of this description it will be sufficient to consider engagement, beginning of conversation or other communication, occurrence of metering pulses, end of communication, and termination of engagement.

Component AR, which is of course also representative of its twin AR', comprises a multiplicity of groups of signal detectors SE(I), SE(II), . . . SE(n) receiving the output voltages of call monitors G(I), G(II), . . . G(n), respectively. The detectors are cyclically controlled by a time base BT which activates them with relative delays depending on the distances of the corresponding call monitors so that signal samples appear in consecutive time slots at the downstream ends of their output multiples 2(I), 2(II), . . . 2(n). The samples pertaining to each line are transmitted concurrently within the assigned time slot on individual output wires, included in the respective group multiple, of the several detectors of the corresponding group. Within a preprocessor UP, also stepped by the time base BT, these output multiples are scanned and their voltage samples are converted into outgoing code words delivered via a multiple 3 to a final processor or minicomputer EL. This processor communicates, via a two-way multiple 4, with an interface unit PE which may include, for example, a recorder such as a tape perforator, a reader therefor and a teletyper enabling an operator to converse with the processor. Thus, unit PE may work into a visual indicator for displaying the collected information, with possible emission of an alarm signal in the event of a detected malfunction, and may also feed instructions to the processor, e.g. modifications of a program used in evaluating the incoming data. Time base BT has an output multiple 20 including a number of connections 201–209 shown in FIG. 2.

Also shown in FIG. 1 is a signal source SS, such as a keyboard, through which an operator may feed readout commands to the preprocessor UP (and to its counterpart UP', FIG. 2, in component AR') via lead 6; that lead may also carry supplemental external information, such as the date and the time of day or variations in the applicable toll charges, manually or automatically transmitted to the preprocessor for inclusion in the outgoing code words. A multiple 19 serves for the correlation of the operations of the two preprocessors in components AR and AR'.

Detectors SE(I)–SE(n) may comprise, for example, magnetic cores with rectangular hysteresis loops acting as current sensors. Their operating cycles, established by clock pulses from time base BT, may include free time intervals during which supervisory operations can be performed in the downstream circuits. All operations relating to a specific trunk line are carried out in the time slot assigned to it. The bits sequentially emitted by each detector in its time slot may be supplemented, in a separate test interval, by a parity bit to enable checking by scanner L1 (FIG. 2); recurrent parity errors may give rise to an alarm signal in a manner known per se.

Figure 2:
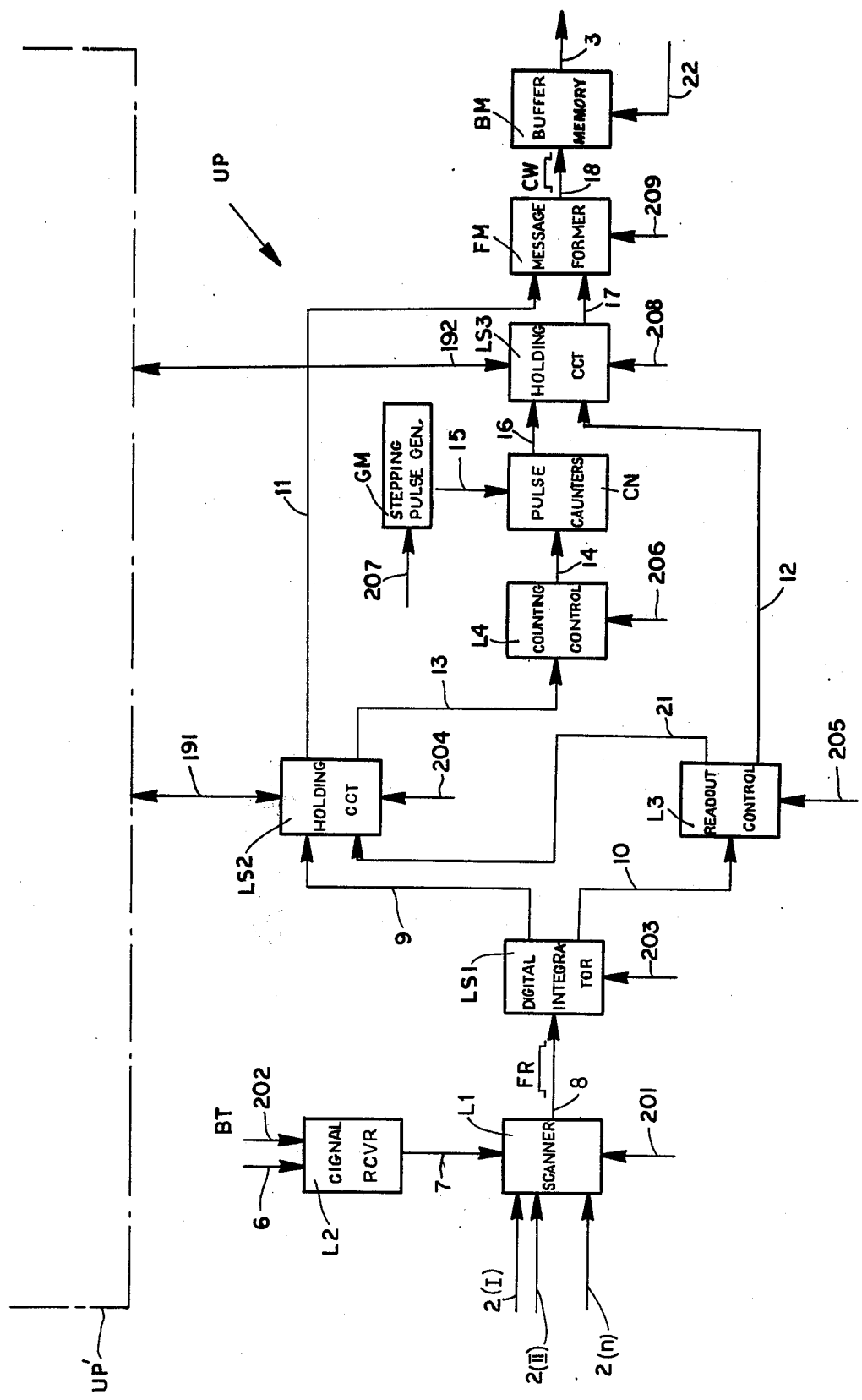
FIG. 2 is a more detailed block diagram of a preprocessor included in the apparatus of FIG. 1.

In FIG. 2 we have shown details of the preprocessor UP and have also indicated, diagrammatically, the identical preprocessor UP' included in component AR' of FIG. 1. Preprocessor UP comprises the aforementioned scanner L1 with inputs connected to outputs 2(I), 2(II), . . . 2(n) originating at the signal detectors SE(I) etc. of FIG. 1. The scanner may comprise a set of multiplexers, with inputs connected to corresponding wires of the several multiples 2(I)–2(n), working into a further multiplexer with an output lead 8. Unit L1, driven by time base BT via connection 201, thus assembles the signal samples on these wires in a periodically recurring TDM frame FR, more fully illustrated in FIG. 3, which is delivered via output 8 to a digital integrator LS1 of conventional type (see, for example, U.S. Pat. Nos. 3,673,340 and 3,622,997) designed to reject spurious status changes (i.e. isolated transitions from a bit "0" to a bit "1" or vice versa) by responding only to those changes which persist over a predetermined number of consecutive cycles. Scanner L1 has a collateral input 7 originating at an ancillary signal receiver L2 to which readout commands and other extraneous information are asynchronously communicated from source SS (FIG. 1) via connection 6. Unit L2, which like unit L1 can be defined as a static logic network, is driven by time base BT via connection 202; unit LS1, which may be regarded as a sequential logic netowrk, is controlled by the time base through connection 203.

Figure 3:
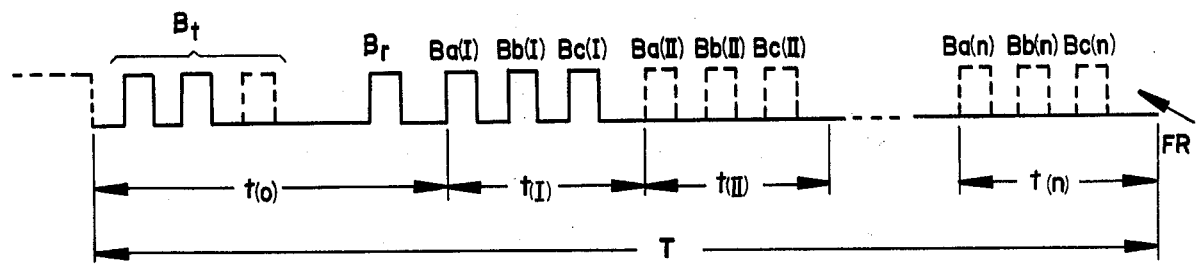
FIG. 3 is a graph illustrating the organization of a TDM frame produced in the preprocessor of FIG. 2.

As shown by way of example in FIG. 3, frame FR has a period T divided into a multiplicity of time slots t(I), t(II) . . . t(n), respectively allocated to the monitored trunk lines SP(I), SP(II), . . . SP(n); an additional interval t(0) is allotted to supervisory operations and to the extraneous signals arriving from receiver L2. Time slot t(I) has a bit position Ba(I) indicating the engagement or nonengagement of the line, a bit position Bb(I) indicating the existence or nonexistence of two-way communication on that line, and a bit position Bc(I) indicating the occurrence of a metering pulse. Analogous bit positions are shown at Ba(II), Bb(II) and Bc(II) in time slot t(II) and at Ba(n), Bb(n), Bc(n) in time slot t(n). Interval t(0) contains, inter alia, bit positions $B_t$ for a time signal and $B_r$ for a readout command.

Integrator LS1, upon detecting a lasting logical transition reflecting a true status change in any bit position of a frame, transmits a request signal via an output lead 9 to another sequential logic network LS2 acting as a holding circuit. The request signal also indicates, e.g. by its polarity, whether the transition is from low to high or from high to low. Unit LS2 may comprise a circulating memory (e.g. as disclosed in U.S. Pat. No. 3,673,340) which temporarily stores, in the phase assigned to the bit position involved, both the request signal and the discriminating information until the same phase of its companion unit in preprocessor UP' contains a like request signal or, failing that, until a predetermined number of clock cycles T have elapsed. In the latter instance, i.e. if correlation between the two paired units is lacking, unit LS2 may insert a malfunction-indicating bit in a special time position or phase of supervisory time slot t(0) of a frame during which it releases the request signal on a lead 11 together with a discriminating signal on an output 13. The verification of correlation between unit LS2 and its twin in preprocessor UP' takes place by way of a line 191 forming part of the connection 19 shown in FIG. 1. Unit LS2 is controlled by time base BT via connection 204.

The readout bit $B_r$, if present for a certain number of clock cycles so as to be recognized by unit LS1, not only gives rise to a request signal on lead 9 as described above but also appears on a second output lead 10 of this unit through which it is fed to another logic network L3 driven by time base BT via connection 205. An output lead 21 of unit L3 extends to unit LS2 to override its holding action whereby the last-mentioned request signal is transferred to lead 11 without delay; the occurrence of this signal in a specific position of time slot t(0) characterizes it as generated by a readout command.

Output 13 extends to a further logic network L4, controlled by time base BT through connection 206, that controls the operation of a set of counters in a unit CN with which it is linked by a connection 14 as more fully discussed hereinafter with reference to FIG. 4. In the embodiment here described, these counters register the durations of engagements and of conversions as well as the number of metering pulses transmitted during these conversations. For duration timing, a train of stepping pulses—e.g. at a cedence of one every ten seconds—is fed to unit CN via a lead 13 from a generator GM which may be free-running but which could also be controlled by the time base BT via connection 207, as shown.

The several counters in unit CN work through a multiple 16 into a sequential logic network LS3 which has a holding function similar to that of unit LS2 and may comprise a circulating memory registering their readings in the proper phases. Unit LS3 receives clock pulses from time base BT via connection 208 and has an output 17 over which these readings are transmitted to a message former FM upon activation of the latter by the arrival of a request signal on lead 11 in the corresponding time position. If the request signal is due to a readout command, occurring in the same time slot t(0), all the readings are transmitted to the message former in the course of the current frame under the control of a switch set by a concurrent signal from unit L3 which is fed by an output lead 12 thereof to unit LS3. Whenever one of the counters in unit CN reaches the limit of its capacity, it generates another request signal which is stored in unit LS3, in a manner analogous to that of unit LS2, until either a confirmation of correlation is received from the corresponding unit in preprocessor UP'—via a link 192 also included in connection 19—or a certain number of clock cycles have elapsed. The release of this request signal to unit FM, with or without generation of a malfunction indication, transmits the reading of the filled counter to the message former without stopping the operation of the counter so that its count recommences on the next metering or stepping pulse. Unit FM is driven by time base BT via connection 209.

The activation of message former FM by a request signal on connection 11 or 17 results in the generation of a code word CW within the time slot in which the signal appears, thus indicating the identity of the line concerned. Request signals occurring in the time slot t(0)—including those resulting from a readout command—do not involve the counters of unit CN at the instant of their appearance so that the accompanying discriminating signals (high/low) pass directly via connections 13, 14, 16 and 17 to message former FM for insertion of a corresponding entry in the outgoing code word. Since not more than one message per time slot can be emitted in any frame period T, unit FM establishes an order of priority in the event that the contents of more than one counter relating to the same trunk line are simultaneously in condition for readout; in that instance, these readouts occur in consecutive periods. Unit FM, upon generating a code word, sends a "data ready" signal via a connection 18 to a buffer memory BM preparatorily to loading that memory which of course must have a sufficient number of stages to accommodate all the data that may be fed in. Memory BM, whose output circuit is the multiple 3 extending to the processor EL of FIG. 1, operates independently of time base BT in response to clock pulses received from the processor on a lead 22.

Figure 4:
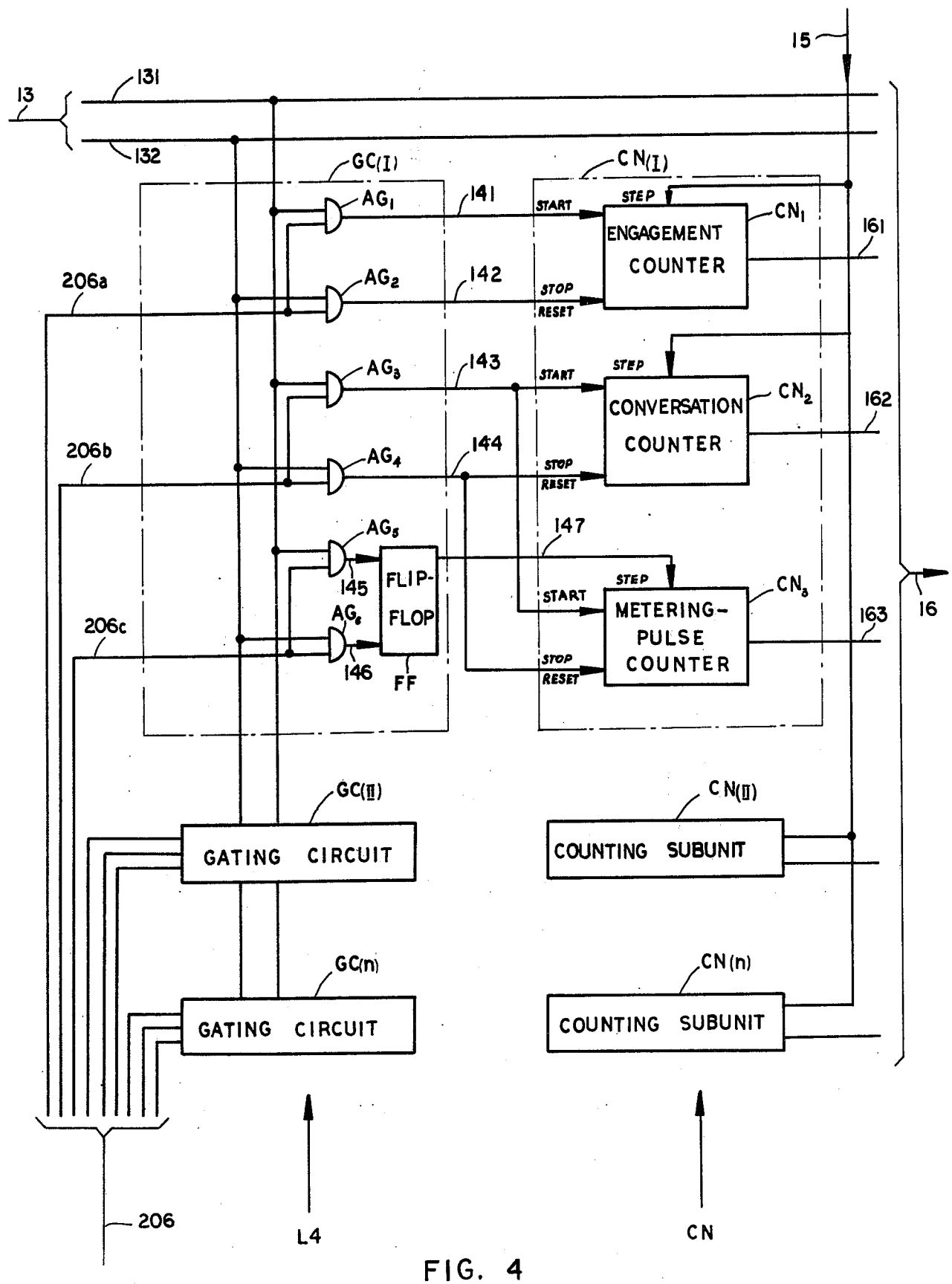
FIG. 4 is a diagram showing details of certain units included in the preprocessor.

As shown in FIG. 4, logic network L4 comprises a number of gating circuits GC(I), GC(II), . . . GC(n) respectively associated with signal detectors SE(I) etc. Each of these gating circuits, as specifically illustrated for circuit CG(I), comprises a set of AND gates $AG_1$-$AG_6$ and a flip-flop FF. Output 13 of unit LS2 comprises two leads 131 and 132 connected to all gating circuits in parallel. Lead 131, whose energization represents a low/high transition, extends to respective inputs of gates $AG_1$, $AG_3$ and $AG_5$; lead 132, energized to indicate a high/low transition, extends to respective inputs of gates $AG_2$, $AG_4$ and $AG_6$. The other inputs of these AND gates are tied in pairs to respective leads 206a, 206b, 206c forming part of the output connection 206 of time base BT, the energization of these leads being so staggered within the allocated time slot t(I) as to coincide with respective bit positions Ba(I), Bb(I) and Bc(I) shown in FIG. 3. If voltage appears on lead 131 during energization of lead 206a, 206b or 206c, AND gate $AG_1$, $AG_3$ or $AG_5$ conducts and energizes a respective output lead 141, 143 or 145. Conversely, if lead 132 carries voltage at any of these instants, the energization of branch lead 132 causes conduction of gate $AG_2$, $AG_4$ or $AG_6$ with resulting energization of a respective output lead 142, 144 or 146. Leads 145 and 146 are respectively tied to a setting input and a resetting input of flip-flop FF which has a lead 147 extending from its set output.

Counting unit CN comprises a number of subunits CN(I), CN(II), . . . CN(n) respectively controlled by gating circuits GC(I), GC(II), . . . GC(n) of logic network L4. As particularly illustrated for subunit CN(I), each of these subunits comprises a set of three binary counters $CN_1$, $CN_2$, $CN_3$. Counter $CN_1$, serving to register the duration of engagements, has a starting input connected to lead 141, a stopping and resetting input connected to lead 142, and a stepping input connected to the lead 15 coming from pulse generator GM of FIG. 2. Counter $CN_2$, designed to register the duration of conversations, similarly has a starting input connected to lead 143, a stopping and resetting input connected to lead 144, and a stepping input connected to lead 15. Counter $CN_3$, which registers the number of metering pulses, also has a starting input and a stopping/resetting input respectively connected to leads 143 and 144, in parallel with counter $CN_2$, and has a stepping input connected to the output lead 147 of flip-flop FF. The counters have outputs 161, 162, 163 which, together with extensions of leads 131, 132, form part of the outgoing multiple 16.

Figure 5:
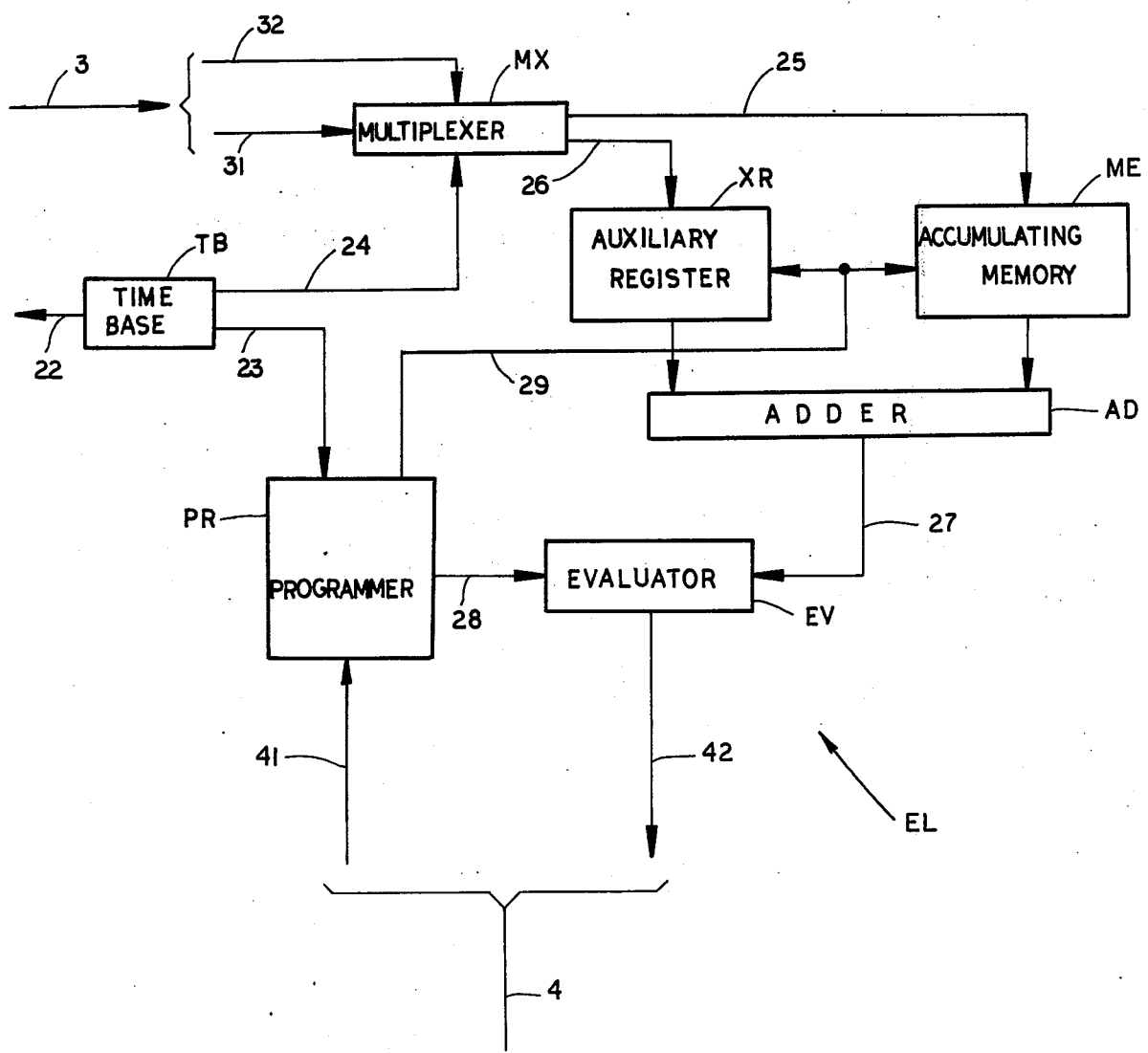
FIG. 5 is a diagram of a final processor forming part of the apparatus of FIG. 1.

FIG. 5 shows the organization of the final processor EL whose principal components are an accumulating memory ME, a programmer PR and an evaluator EV. Programmer PR can receive instructions from interface unit PE (FIG. 1) via an input 41 which, together with an output 42 of evaluator EV, forms part of the two-way connection 4. Multiple 3, extending from buffer memory BM of preprocessor UP (FIG. 2), includes connections 31 and 32, the latter terminating at a switching input of a multiplexer MX which alternately extends the connection 31 to an input 25 of memory ME or to an input 26 of an auxiliary register XR. Memory ME and register XR work into an adder AD which has an output 27 leading to evaluator EV, the latter being also connected to an output 28 of programmer PR. A time base TB has several outputs, i.e. the lead 22 going to buffer memory BM in FIG. 2, another lead 23 controlling the operation of the programmer PR and a further lead 24 going to a second switching input of multiplexer MX. An output 29 of the programmer reads the memory ME and empties the register XR whenever it is desired to update the information in the output 42 of evaluator EV in accordance with a prerecorded program or in response to a control signal fed in via input 41, e.g. concurrently with a readout command.

Memory ME registers the totals of the statistical data received for a certain period from preprocessor UP, i.e. the number of engagements of each monitored line, the cumulative length of these engagements, the number of conversations on each line, the cumulative length of these conversations, and the total number of metering pulses, all as obtained from the respective counters of FIG. 4 by way of units LS3, FM and BM shown in FIG. 2. Whenever any of these counters is read via unit LS3 upon reaching its full count or in response to a status change of the corresponding trunk line, i.e. at the end of each engagement or conversation, its contents are transferred to the corresponding part of memory ME to increment the total previously stored therein for this particular criterion. If, however, a message arrives over multiple 3 in response to a readout command, thus without a resetting of the counters, the corresponding bit in that message appears on lead 32 to switch the multiplexer MX into its alternate position in which the contents of the counter are delivered to register XR rather than to memory ME. Upon the next reading of the memory, therefore, evaluator EV receives the current total even though the amount stored in memory ME has remained unchanged as is necessary in order to prevent an iterative inclusion of the current count in the total stored in that memory. Time base TB subsequently restores the multiplexer to its normal position.

Operation

Let us consider, by way of example, a seizure of trunk SP(I) by a calling subscriber. Monitoring unit G(I) responds to this seizure by energizing its output lead 1a so that the associated detector in group SE(I) senses a transition in the voltage of that lead from a logical "0" to a logical "1". That transition is reflected in an amplitude change of the voltage sample periodically transmitted by the detector on its output wire, under the control of time base BT, to a corresponding input of scanner L1 during the allocated time slot t(I). The scanner, after carrying out the aforementioned parity checks, thereupon generates the bit Ba(I) of TDM frame FR as shown in FIG. 3.

Unit LS1, upon receiving a predetermined number of recurrences of frame FR in which the engagement bit Ba(I) has the logical value "1", emits on lead 9 a request signal indicative of this change of status. Unit LS2 temporarily stores this request signal unless its counterpart in preprocessor UP' has received a like signal by that time; when the signal contents of the two units coincide, as determined by connection 191, the request signal is transmitted over lead 11 to message former FM while the associated discriminating signal is sent to counting-control unit L4. In the absence of a correlation confirmation from preprocessor UP', the request signal and the discriminating signal will be released after a predetermined number of clock cycles.

Unit L4 determines from the discriminating signal on lead 131 and from its position within the assigned time slot that this is the criterion of a beginning engagement. It thereupon energizes its output lead 141 to start the counter $CN_1$ which subsequently advances is response to the stepping pulses fed in on lead 15. Since all the counters are empty at this instant, the amount registered in the corresponding time position in unit LS3 is zero. Upon receiving the request signal, therefore, message former FM determines from the voltage on lead 131 that trunk SP(I) is being seized and enters this information in the appropriate section of the code word CW then transmitted to buffer memory BM.

In the case of an abortive call, i.e. if no connection is made to a called party, the disengagement of the trunk line gives rise to another request signal which acts in the same way as the preceding one, except that now the leads 132 and 142 are energized in lieu of leads 131 and 141 to stop and reset the counter CN(I). At that point there is registered in unit LS3, in the time position of bit Ba(I), the amount last reached by counter CN(I); that count, accordingly, is encoded by the message former FM along with the information that trunk SP(I) has been disengaged. Memory ME of processor EL receives this count to increment the total recorded length of such engagements and to increase their recorded number by one.

If the called party answers and communication is established, the arrival of a request signal in time position Bb(I) causes the energization of lead 143 to start counters $CN_2$ and $CN_3$ of subunit CN(I). Thus, the outgoing code word CW carries the message of beginning conversation and a count of zero for its duration and for the number of metering pulses. (Two successive frame periods T are needed for this purpose.) The arrival of the first metering pulse on trunk line SP(I) causes a low/high transition in time position Bc(I) and thus gives rise to a request signal, but output lead 11 of unit LS2 is blocked in this time position by time base BT; lead 145, however, is energized at that instant to set the flip-flop FF whereupon a pulse and lead 147 advances the counter $CN_3$ by one step. The termination of the metering pulse, similarly, results in the energization of lead 146 to reset the flip-flop. In this manner, counter $CN_3$ registers the number of metering pulses generated during the conversation.

If the engagement is long enough to let counter $CN_1$ reach the limit of its capacity, that counter emits a request signal which is stored in unit LS3 together with the full count for readout upon reception of a confirmation of correlation from preprocessor UP' or, in its absence, after the elapse of the predetermined delay period. The message formed by unit FM in this case does not indicate the end of conversion so that only the total length of engagements is incremented by memory ME when that message is subsequently transmitted to processor EL.

The end of conversation produces again a request signal in time position Bb(I), now accompanied by high voltage on lead 132 so that least 144 is energized to stop and reset the counters $CN_2$ and $CN_3$ with readout of their contents, in consecutive frame periods, to message former FM (via unit LS3) as described above for the reading of the contents of counter $CN_1$. If engagement and conversation terminate simultaneously, the three counters are read out in consecutive frame periods.

The occurrence of a readout command instantly energizes the leads 11 and 12 and causes the scanning of the circulating memory of unit LS3, with reading of the contents of all counters $CN_1$ in time positions Ba(I)--Ba(n), counters $CN_2$ in time positions Bb(I)-Bb(n) and counters $CN_3$ in time positions Bc(I)-Bc(n) of time slots t(I)-t(n). Counters that are active at this time are not reset and continue their advance until the arrival of the next stop signal.

As will be apparent to persons skilled in the art, the apparatus according to our invention could be readily modified to register data other than those specified above. Thus, for example, a counter in unit CN could be advanced by detected dialing pulses and deliver its reading at the end of each pulse train to message former FM for registration of the dialed digit in memory ME of processor EL.

We claim:

1. In an apparatus for supervising the activities of different signal paths of a telecommunication system as determined by respective monitoring units, comprising a plurality of signal detectors respectively connected to said monitoring units for receiving output voltages thereof, scanning means connected to all said signal detectors for deriving from said output voltages a recurrent TDM frame having different time slots respectively allocated to said monitoring units, discriminating means connected to said scanning means for determining the beginning and the end of an activity detected in any of said time slots, a set of counters triggerable by said discriminating means for registering numerical values respectively related to the activities detected in corresponding time slots, conversion means controlled by said discriminating means for generating code words representative of the readings of said counters and identifying the signal paths associated therewith, memory means connected to said conversion means for storing said code words, and evaluating means connected to said memory means for comparing the contents of the stored code words with a preprogrammed set of parameters, the improvement wherein said memory means comprises an accumulating memory loadable with said code words by said conversion means in response to end-of-activity signals from said discriminating means by which the respective counters are cleared, said conversion means being responsive to extraneous readout commands not resulting in a clearing of the counters for generating code words distinctively identified to bypass said accumulating memory in conveying the instantaneous readings of all said counters to said evaluating means, thereby preventing iterative inclusion of the readings of any counter in the accumulated totals.

2. The improvement defined in claim 1 wherein said evaluation means includes arithmetic means responsive to a characteristic part of a distinctively identified code word for additively combining the instantaneous reading of a counter as conveyed by said code word with past readings thereof as stored in said accumulating memory.

3. The improvement defined in claim 1 wherein said conversion means is operable by a signal from an active counter reaching the limit of its counting capacity for loading said accumulating memory, independently of any end-of-activity signal, with a code word indicating the full count of said active counter, the latter thereupon recommencing a new count.

4. The improvement defined in claim 1 wherein said scanning means and said conversion means are part of a preprocessor provided with timing means for synchronizing the operation thereof with that of said signal detectors, said accumulating memory and said evaluating means being part of a final processor operating independently of said timing means.

5. The improvement defined in claim 4 wherein said memory means further comprises a buffer memory included in said preprocessor for the temporary storage of said code messages prior to transmission thereof to said final processor.

6. The improvement defined in claim 4 wherein said conversion means comprises logical circuitry receiving said TDM frame from said scanning means and message-forming means controlled by said logical circuitry for generating outgoing code words in response to differences between successive recurrences of said TDM frame reflecting certain status changes in the monitored signal paths.

7. The improvement defined in claim 6 wherein said scanning means has a collateral input for receiving extraneous signals including said readout commands insertable into said TDM frame, said logical circuitry including control means responsive to the appearance of a readout command in said TDM frame for activating said message-forming means independently of said status changes.

8. The improvement defined in claim 7 wherein said preprocessor is divided into two identical and cross-connected sections operating in parallel, said logical circuitry further including holding means in each section controlled by said timing means for establishing a predetermined delay period following any of said status changes within which activation of said message-forming means in response to said differences depends upon identical processing of said TDM frame by said sections, said holding means being connected to said control means for eliminating said delay period in the presence of a readout command.

9. The improvement defined in claim 6 wherein said output voltages include criteria for the engagement of a signal path by a calling station and for the establishment of communication between the calling station and a called station, said counters including a first group of counters for measuring the duration of said engagement, a second group of counters for measuring the duration of said communication, and a source of stepping pulses connected to said first and second groups of counters, said message-forming means being activable by an engagement-terminating criterion and a communication-terminating criterion to incorporate the readings of respective counters of said first and second groups in outgoing code words.

10. The improvement defined in claim 9 wherein said output voltages further include replicas of metering pulses transmitted over the monitored signal paths, said counters further including a third group of counters connected to operate concurrently with respective counters of said second group for determining the number of metering pulses occurring during a communication, the counters of said first group and the counters of said second and third groups being respectively resettable by said engagement-terminating and communication-terminating criteria upon incorporation of their readings in outgoing code words.

* * * * *